INVENTORS
KENNETH D. ASHLEY,
ALPHONS O. JAEGER,
BY
Wm P. Spielman
ATTORNEY

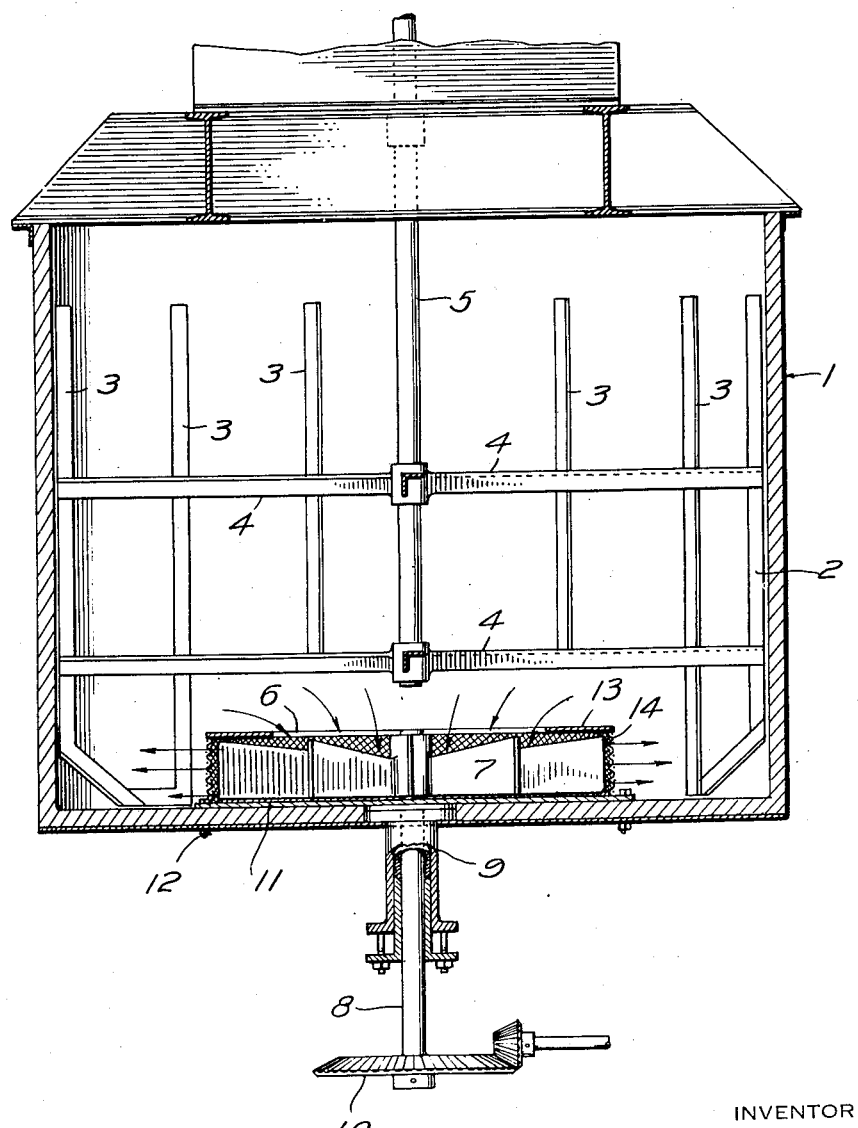

Patented Aug. 9, 1949

2,478,519

UNITED STATES PATENT OFFICE 2,478,519

PROCESS OF MANUFACTURING SILICA-BASE GEL CATALYSTS WHICH INCLUDES AGING

Kenneth D. Ashley, Noroton, and Alphons O. Jaeger, Greenwich, Conn., assignors to American Cyanamid Company, New York, N. Y., a corporation of Maine Application January 16, 1945, Serial No. 573,078

13 Claims. (Cl. 252—451)

1

This invention relates to the manufacture of adsorbent gels such as are used as drying agents and catalysts and more particularly to the manufacture of gel-type catalysts containing oxides or hydrous oxides of metals of the third and fourth groups of the periodic system. While the principles of the invention may be applied to the production of gel-type catalysts for any purpose, they are particularly useful in the manufacture of cracking catalysts, dehydration catalysts and hydrogenation and dehydrogenation catalysts of any desired particle size, such as those employed for the catalytic dehydrogenation, cracking or catalytic reforming of petroleum fractions or for the production of butadiene or of high octane gasoline and those used for dehydrating glycols such as 1,4-, 2,4- or 2,3-butylene glycols to butadiene. Catalysts prepared by the process of the present invention may also be used for the production of olefins of higher molecular weight by the dehydrogenation of higher boiling petroleum fractions such as still bottoms.

An important class of gel-type catalysts in wide commercial use for dehydrogenation and cracking reactions are silica catalysts prepared by precipitating hydrated silica from waterglass solutions. Alumina-silica and other promoted silica catalysts are produced by precipitating solutions containing aluminum, zirconium, titanium, cerium, thorium or their mixtures on a precipitated silica hydrogel. Representative catalysts of the first class are described in United States Patents Nos. 2,285,314 and 2,287,917. It is a principal object of the present invention to provide an improved method for the manufacture of catalysts of these classes, which process is especially adapted to the large scale manufacture of gel-type catalysts of high efficiency. In their broader aspects, however, some of the features of the present invention are applicable to the manufacture of any gel-type catalyst consisting of or comprising active silica.

One of the most widely used catalytic cracking processes is the "fluid stream" process which is described in vol. 35 of the Journal of Industrial and Engineering Chemistry, pages 626–630. This process employs a finely divided gel-type catalyst containing about 80–90% silica and 10–20% alumina, although for some purposes a part or all of the alumina may be replaced by other polyvalent metals such as those noted above. The present invention is adapted for the large scale manufacture of catalysts for use in this process, although the principles thereof are not limited to the production of catalysts having a fine particle

2 size. On the contrary, they may be applied in the production of coarse catalyst grains, pelleted catalysts, spherical catalyst particles, extruded catalyst, and in general without limitation as to the final form which the finished catalyst material may take.

In order to produce good yields of high-octane gasoline a satisfactory cracking catalyst should have high initial activity. Moreover, because the normal use of these catalysts involves frequent regeneration by exposure to steam and hot oxygen-containing gases to volatilize and burn out carbonaceous deposits, they must possess a satisfactory degree of catalytic activity after repeated regenerations. The following two tests for catalytic activity have therefore been established by the petroleum industry:

1.—Initial activity
2.—Thermal stability

The operating test procedure is as follows: 25 cc. of catalyst are filled into a tube heated in a furnace at 938° F. and a Mid-Continent gas oil charging stock is evaporated and the vapors passed through the catalyst at a rate of 100 cc. of oil per hour for a total test period of two hours. The vapors from the catalyst are cooled to room temperature and the condensate subjected to an Engler distillation.

The portion boiling below room temperature is called uncondensed gases and that boiling up to 400° F. is called gasoline. The total quantity of gasoline and uncondensed gases is compared with the quantities produced with a catalyst which has been adopted as a standard by the industry. The results are expressed as percentages; i. e., an initial activity of 100 means that the total amount of gasoline and non-condensable gas is the same as that produced from the same charging stock by the standard catalyst.

The test for initial activity is run on the fresh catalyst as manufactured. The test for thermal activity is run on the fresh catalyst after it has been heated for two hours at 1112° F. and then at 1652° F. for six hours. A minimum specification of 50 (i. e., 50% of the initial activity of the standard catalyst) have been established for thermal stability or activity.

Objects of the invention

The large size and enormous daily capacity of the fluid catalyst cracking units results in a daily demand for car-load quantities of catalysts by the petroleum industry. This is an unprecedented demand in the field of catalysis. In order to supply this demand, it is apparent that a satisfactory manufacturing process must operate on a large scale, and preferably continuously. Laboratory or small-batch techniques such as those described in the above-mentioned patents cannot be used. In order to obtain the necessary resistance to high temperatures, the alkali metal content of the catalyst must be reduced to a very low figure, preferably less than 0.05%, and this requires the dewatering and washing of many hundreds or even thousands of tons of gelatinous silica slurry each day. Moreover, the high standards of initial activity and thermal stability desired by the industry require an extremely close and uniform control throughout each step of the process.

It is a principal object of the present invention to provide manufacturing methods for the production of catalysts of the class described above, which methods will operate satisfactorily on a large industrial scale. This object includes the provision of manufacturing processes which will regularly produce many tons per day of siliceous gel-type catalysts having optimum initial activity and thermal stability. A further important object is the provision of a manufacturing method which can easily be modified to obtain optimum physical and chemical properties for the cracking of various hydrocarbon charging stocks, as will hereinafter be explained. A still further important object is the provision of a process that can easily be varied to compensate for seasonal temperature changes which, we have found, constitute a serious problem in the large scale production of catalysts of uniform quality.

Outline of the process

The general methods for the production of gel-type catalysts containing a siliceous skeleton of high surface activity promoted by a content of alumina or other polyvalent metals include the following principal steps:

(a) Precipitation of hydrated silica from alkali metal silicates such as sodium water-glass.

(b) Deposition or coating of alumina and/or other polyvalent metal oxides on the hydrous silica.

(c) Removal of alkali metal and other impurities from the silica before or after coating.

(d) Dehydration and calcination to form the finished catalyst. Although these four steps are outlined in the above-mentioned patents, it will be noted that the procedures used are those of the laboratory, and do not constitute a large-scale commercial manufacturing process. The present invention, on the other hand, modifies and supplements the laboratory procedures outlined in these and other similar patents in such a manner that the catalyst produced on a tonnage basis by the commercial manufacturing plant will have an initial activity and thermal stability as good or better than the laboratory products described in these patents. The invention is based on our discovery that various factors entering into the formation, aging, coating and filtering of hydrated silica slurries and the dehydration and calcining of the resulting catalyst material slurries have a profound effect on the initial activity and thermal stability of the finished catalyst. This is true for the following reasons:

The initial activity of a cracking catalyst is dependent largely upon the porosity, capillarity and surface area of the product. A catalyst having a high initial activity possesses a tremendous number of capillaries, and therefore an enormous surface area per gram of catalyst. Unfortunately, however, excessive porosity with its resulting high adsorptive properties may have a detrimental effect on the very important property of thermal stability, for the walls of the catalyst may be too thin and weak to withstand the process of regeneration. In burning out the carbon deposits during regeneration the high temperature conditions together with the steam used and that generated by the combustion will tend to break down and thereby reduce the active centers or specific surface of the internal structure of the catalyst granules, and sufficient rigidity and mechanical strength to withstand this action is necessary to obtain good thermal stability. It is evident, therefore, that an optimum mean value must be established between the highest possible initial activity and the highest thermal stability, and this is the reason for the standard test values of 90–100 for initial activity and 50 or better for thermal stability that have been established by the petroleum industry.

Precipitation of hydrated silica slurries

The methods which we employ for the precipitation and flocculation of hydrated silica slurries of the type which will produce catalysts of optimum properties are described generally in our copending application Serial No. 459,262, filed September 22, 1942, now U. S. 2,411,820, of which this application is a continuation-in-part. A solution of sodium or potassium silicate is prepared in a mixing tank provided with suitable high speed agitators, preferably at a concentration which will form a slurry containing about 3–6% of $SiO_2$ in the form of gelatinous silica after acidification. Sulfuric, hydrochloric, nitric or other mineral acid is added over a period not less than 15 minutes, and preferably 30–40 minutes, in the amounts necessary to precipitate the silica. The acidification is preferably carried out by adding 25% sulfuric acid in a continuous well-distributed stream, to a final pH of about 4–6. After a complete acidification in this matter 16% aqua ammonia solution is preferably added to raise the pH to about 6.7, which is the optimum value for aging.

The factors involved in the process (temperature, concentration of solids, pH and aging time) are very closely interrelated, and must be considered together. Because of the large quantities of water used it may not be feasible to maintain a close control of the temperature of the process water or of the waterglass solutions; however, we have found that the other factors may be varied to compensate for seasonal temperature differences. We have found that in summer weather the concentration of the silica solution should be such as to form a silica slurry having a solids content of about 3.5–4.5%, whereas in winter weather the solids content may be raised to 4.5–5.5% with an optimum value of 5%. However, unusually low solids contents may result in excessively high densities in the finished catalysts, as is shown in Fig. 5 of the drawings, and should be avoided.

The particle size of the grains of gelatinous silica should be carefully controlled to promote alkali metal removal. A catalyst of good activity can be obtained from slurries having a very fine particle size, but such slurries are extremely difficult to filter and wash and therefore the alkali metal content is apt to be excessively high. If on the other hand the particle size is too coarse the alkali metal content is also high because the water-soluble salts are not completely removed from the grains of silica. We find that a slurry wherein more than 95% of the particles will pass through a thirty-mesh sieve but will be retained by a 300-mesh sieve should be employed. This particle size may be obtained by means of a turbine type agitator provided with a well-distributed acid supply and surrounded by a screen having 6 to 8 meshes per inch which produces lines of shear in the solution during the acid addition. A precipitator or strike tank equipped with suitable agitators is shown in Fig. 6 of the drawings.

Aging the hydrated silica

In our copending application Serial No. 459,262, now Patent No. 2,411,820, dated November 26, 1946, we discussed the importance of a preliminary flocculation of the hydrated silica slurries. In that application we stated:

We have discovered that an aqueous suspension of hydrous oxides consisting of or containing gelatinous hydrated silica can be pretreated in such a manner as to facilitate the filtration and washing thereof without impairing the activity of gels produced when the hydrated silica is dried and calcined. The most important feature of our pretreatment is referred to hereinafter as a flocculation step and the silica so treated is referred to as flocculated silica, but it should be understood that these terms refer to the condition and behavior of the silica or other hydrated metal oxide during the dewatering and washing thereof rather than to any noticeable change in the aqueous suspensions after the flocculating agent has been added. In practicing our invention we subject the aqueous suspensions containing gelatinous hydrated silica to a conditioning procedure which does not materially change the density, appearance or degree of dispersion of the hydrated silica particles in the aqueous slurry, but which so modifies these particles that they form a relatively thick, porous filter cake of good mechanical strength instead of the ordinary thin, slushy filter cakes that are obtained when ordinary gelatinous silica suspensions are filtered. We have found that aging appears to aid materially in obtaining a relatively thick and porous filter cake; in fact, we have noted improvements in the filtration and washing of slurries of gelatinous hydrated silica which had been aged for 1-2 hours, but to which no flocculating agent was added. Our invention in its broader aspects therefore includes the combined steps of aging followed by filtration as one of its important features.

A number of important advantages are obtained by preconditioning pulps or slurries of gelatinous hydrated silica in the manner described above, prior to the dewatering thereof. We have found that inorganic salts such as sodium sulfate, sodium nitrate, sodium chloride and the like can be more rapidly and completely removed from a flocculated silica slurry by washing as well as by filtration, and the silica can therefore be dewatered by any suitable procedure. Moreover, flocculation of the hydrated silica also results in a final dried product of much greater uniformity in particle size, as compared with the irregular size of the particles obtained by drying hydrogels of silica or silica and alumina obtained by the ordinary methods heretofore employed. Our invention in its broader aspects therefore includes the dewatering and washing of flocculated silica by any suitable method including filtration, settling and decantation, thickening and the like.

Figures 3 and 5 of the drawings show quantitatively the effect of aging on the activity of the catalyst, particularly with respect to the thermal stability. Aging also is an important factor in obtaining a catalyst substantially free from alkali metal compounds as is pointed out in the above quotation from our earlier application. The factors involved in the aging procedure are (1) time of aging, (2) aging temperature, (3) pH control and (4) amount of gelatinous silica in the slurry.

Although our invention is not limited by any theory of operation, but is intended to provide a practical manufacturing process regardless of the exact nature of the chemical or physical changes involved, we believe that at least three important changes take place in the gelatinous silica during aging. These changes are (a) coagulation or agglomeration of the silica particles to produce a slurry containing grains of favorable and more uniform particle size range with a reduction in the amount of slimes, (b) formation of silicic acid polymers of high molecular weight with concomitant building of the siliceous skeleton of silicic acid gels and (c) progressive dehydration or loss of water of hydration from the silica with consequent thickening and stiffening of the walls of the silica gel. The combined effect of these and other results of aging are properly summarized as flocculation since their result is to increase the homogeniety of the gelatinous silica, thereby permitting its filtration and washing on a rotary vacuum filter, and to improve the mechanical strength of the gel structure. Suitable flocculation is obtained by operating in accordance with the following principles:

Under constant conditions of temperature and solids content there is a decided improvement in the filtration characteristics of the silica slurries with increased aging up to a certain optimum value, after which further aging produces little or no improvement. The aging time necessary to reach this optimum filtration value, which is also the optimum for producing a catalyst of enhanced thermal stability, decreases with a moderate increase in temperature of precipitation and aging of the slurry, up to a value in the neighborhood of 100° F. At higher temperatures there is a marked deterioration in filtering characteristics and catalytic activity regardless of the degree of aging. The aging time is also shortened by an increase in the silica content of the slurry up to about 6%. Aging at higher solids content than 6% is not commercially feasible because of the liability of continuous gel formation. These factors are illustrated in Figs. 3-5 of the drawings.

Aging of freshly precipitated silica slurries, obtained by the addition of an acid such as sulfuric acid to alkali metal silicate solutions, should be carried out within a pH range between about 5.5 and 8.1. Aging at acidities below a pH of about 5.5 does not result in flocculation of the silica. Within the range specified, there is very little change with changes of the pH value; however, a pH of around 6.5-7 appears to be optimum for best filtering and washing of the catalyst gel. After the aging is completed, however, the pH should be reduced to about 4-4.8 to obtain complete removal of alkali metal from the silica.

The gel structure, apparent density and thickness and physical strength of the walls of the catalyst are profoundly influenced by the temperature, length of time and concentration of solids during the precipitation and aging of the gelatinous silica, and therefore these factors should be closely controlled to obtain optimum thermal stability consistent with high initial activity in the catalyst. Thermal stability in the catalyst increases with increased aging time, since the aging tends to strengthen and thicken the walls of the silica skeleton; however, this same thickening necessarily results in some loss of initial activity in the catalyst. We have found, however, as one of the principal features of our invention, that when the precipitation and aging are controlled in the manner described above there is obtained a catalyst having optimum thermal activity and a long effective life as well as very satisfactory initial activity.

Precipitation of alumina

The aged gelatinous silica is impregnated or coated with alumina, or with a mixture of alumina and zirconia or other ingredients capable of functioning as activating agents. The coating step may be carried out either before or after the silica has been dewatered and washed to remove soluble salts and residual combined alkali metal. Both methods of coating are illustrated in the attached drawings, and both are included within the scope of the invention.

The coating is preferably carried out by adding the proper quantity of coating material in the form of a water solution of sulfates, nitrates or other water-soluble salts of the coating metal or metals, agitating to obtain a uniform mixing, and then precipitating by the addition of an alkali which is preferably ammonium hydroxide. Before adding the coating solution, however, it is important to add sufficient 25% sulfuric or other acid corresponding to the anion of the coating salt to reduce the pH of the silica slurry to an extent which will prevent a preliminary and uncontrolled precipitation of coating material in the silica before uniform mixing is completed. When aluminum sulfate is used as the coating material the pH should be reduced to about 3–3.5; other coating salts may require a different pH value. We have found that the filtering characteristics of the impregnated slurry are much improved by this preliminary acidification.

The coating solution is preferably added during a period of about ten minutes and agitation is continued for an additional ten minutes to obtain complete mixing. A 16% aqua ammonia solution is then introduced over a period of about 25–30 minutes with constant agitation. When the pH rises to 5–5.5 the ammonia addition is stopped and the slurry is ready for dewatering.

Filtration and washing

By proper control of the process variables discussed above, we have succeeded in improving the filtering characteristics of both coated and uncoated silica slurries to such an extent that the dewatering can be carried out continuously on a rotary vacuum filter, and this is one of the principal advantages of our invention. The filtration characteristics are profoundly affected by the pH of the coated or uncoated silica slurry just prior to the first filtration step. Too low a pH, such as one substantially below 4.0, produces a thin and slimy filter cake which blinds the filter cloth and quickly reduces the capacity of the filter. A high pH results in a cake which is too thick for efficient washing. We have found that a pH of 4–5.5 is optimum and results in a filter cake of about 0.75 inch thick which is easily washed.

When the silica slurry has been properly processed and its physical condition is right the filtering operation is continuous and smooth. The speed of the filter can be varied over a fairly wide range, peripheral speeds of from 3 to 7 feet per minute being about the optimum range, but better results are obtained with lower speeds within this range.

The wash water should be applied continuously to the filter cloth at all times during the filtering operation. It is preferably applied by atomizing low pressure sprays applied uniformly over the exposed surfaces of the filters, starting immediately after the cake leaves the bath and stopping at the point of cake removal. If not enough water is used at any one point, and the cake is sucked dry for even a very short time, the cake immediately cracks and the efficiency of washing is greatly reduced. If too much water is used, inadequate washing results because the cake is relatively soft and slimy, particularly on the first filter. About 3–4 gallons per minute of wash water acidified to a pH of 3–5 is applied to each square foot of exposed filter area on all filters except the last with preferably a pH of about 3 on the second and third. On the last filter the pH of the wash water is preferably 4.2 and the quantity is reduced to about half.

Dehydration and calcination

The coated catalyst gel leaves the last filter with a moisture content of about 90%, and must be dehydrated and calcined to produce the finished catalyst material. This means that about ten tons of water must be evaporated for each ton of finished catalyst, the last 10–15% of which is water of combination that is held very tenaciously. The dehydration is preferably conducted by contacting the gel with hot products of combustion in two or more separate stages, the earlier of which is adapted to evaporate free moisture while the last stage completes the removal of uncombined moisture and also removes the water of combination.

The dehydration and calcination may advantageously be carried out in brick-lined rotary kilns wherein the catalyst gel passes in countercurrent contact with hot gases from the combustion of coal, natural gas or other suitable fuel. These kilns are preferably set on a slight incline and are provided with retention dams to prevent the catalyst material from flooding through the kiln. While there is little danger of overheating in the first dehydration kiln, care should be taken to avoid direct contact of flame with the catalyst material at any time, and the catalyst should not be heated to temperatures higher than 800–1200° F.

Considerable quantities of finely divided catalyst are frequently blown from the kilns by the gases, and therefore it is advisable to pass these gases through a spray tower for its removal and recovery. Experience has shown that the catalyst recovered from the gases in this manner is comparable in quality and activity with that obtained from the catalyst discharge of the kiln, and therefore the recovered catalyst dust can be mixed with the plant product.

A very important and unexpected advantage resulting from operating in a rotary kiln in countercurrent contact with hot gases is the fact that a large proportion of the residual sodium, potassium or other water-soluble salt is removed from the catalyst gel during the calcination. This is an important feature of our invention, for it permits us to feed to the dehydrators, if desired, a wet filter cake having a content of sodium sulfate or other water-soluble impurity considerably higher than the maximum permissible in the finished catalyst. An important reduction in the amount of filtration and washing can thereby be obtained, which increases materially the capacity of the filters.

Apparently the removal of water-soluble salts results from the volatilizing action of the hot gases in the kiln. In the dehydration of the capillaries, minute crevices, pores and tiny passages, the steam formed by heating the catalyst is apparently evolved at fairly high velocity and carries with it the water-soluble salts that were dissolved in the water evaporated. Production records of kiln operation over a substantial period of time have shown that the average removal of sodium as sodium sulfate in this manner is about 80–85% so that a filter cake from the fourth filter containing, for example, 0.2% $Na_2O$ will produce a calcined catalyst containing only 0.033% of $Na_2O$. When the filtration capacity is such as to produce a filter cake of considerably lower sodium content, such as 0.02% of $Na_2O$ the percentage removal of sodium during calcination is not materially reduced; therefore in this case the finished catalyst will contain only about 0.0004% of $Na_2O$. These results were obtained in a rotary kiln operating at an average gas inlet temperature of 1200–1400° F. and with a filter cake averaging 10% solids.

When gas inlet temperatures of 1200–1500° F. are used in the drying kiln and also in the calcining kiln the drying and calcining operations are finished in about 30–60 minutes. These times are much shorter than those that must be used when other methods of drying and calcining are employed.

The principles of our invention will be further described and illustrated by reference to the accompanying drawings, wherein:

Fig. 6 is a vertical section, with parts shown in elevation, of a suitable precipitator or strike tank for precipitating the gelatinous silica.

Figure 1:
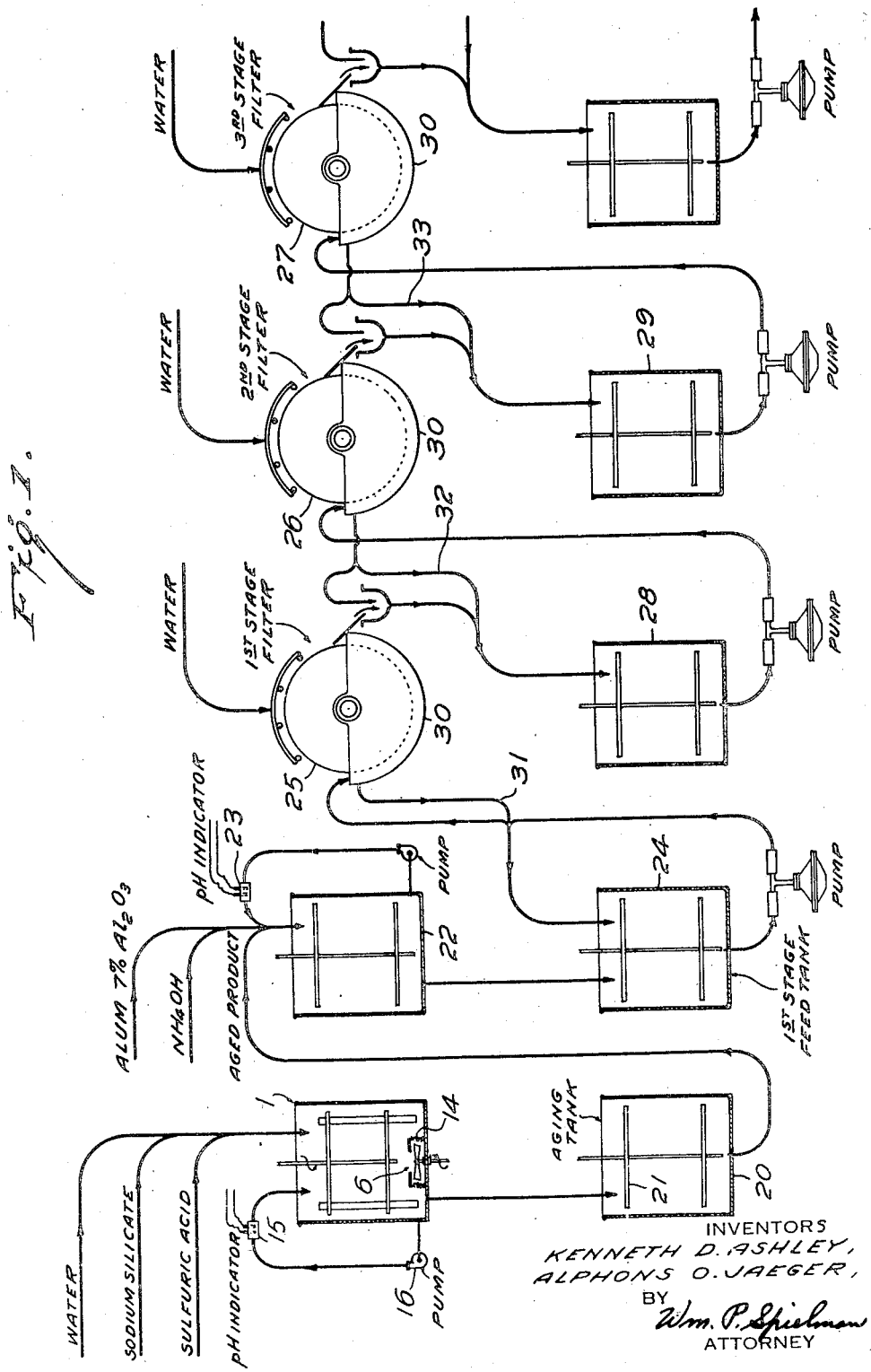
Fig. 1 is a flow sheet illustrating diagrammatically a process of catalyst manufacture in which the activating coating material is added prior to the first filtration.

Referring to the process of Fig. 1, it will be seen that a dilute aqueous solution of sodium silicate is first prepared in the precipitator or strike tank 1, preferably at a concentration which will form a slurry containing about 3–6% of gelatinous silica after acidification. The exact concentration may be varied with the temperature of the process water, for reasons which have been pointed out. For temperatures of 85° F. and higher, 5% solids are practical, whereas below this point 4.5% solids are probably maximum and 4% or lower may be used in winter weather if the process water is not preheated. Commercial silicate of soda containing about 29% $SiO_2$ and 8.8–9.0% $Na_2O$ has been used with success. The water used is ordinary water that has been passed through an ion exchange softening process to remove all hardness and practically all of the potassium and sodium. Distilled water need not be used.

The arrangement of the agitators and degree of agitation in the strike tank 1 is important, and therefore this tank is shown in detail in Fig. 6 of the drawings. Referring to this figure it will be seen that the tank 1 is an open cylindrical tank, preferably of wooden construction, containing a large gate-type agitator 2 made up of a number of vertical staves 3 attached to crosspieces 4 which in turn are suspended from a central drive shaft 5. The tank is also equipped with a high speed turbine-type agitator 6 having curved blades 7 attached to a shaft 8 which passes through the bottom of the tank through a stuffing box 9 and is driven by gears 10 at a speed of approximately 80 R. P. M. This agitator is mounted on the floor of the tank, as by a base plate 11 and bolts 12 and is fitted with an annular framework 13 having an outer cylindrical screen 14 laterally of the blades 7. In operation the silica slurry is drawn in at the top of the agitator, as indicated by the curved arrows, and is discharged through the screen, which serves to break up lumps or pellets of gelatinous silica and produce a slurry of uniform particle size. The screen 14 is preferably of 6–8 mesh.

Sulfuric acid of 25% strength is added to the sodium silicate solution in the tank 1 until a pH of 4–6 is obtained. The pH values are controlled and recorded throughout the procedure by a recording pH meter 15 which measures a continuous sample of the slurry that is withdrawn by means of pump 16. After all the acid has been added a 16% aqua ammonia solution is immediately introduced until the pH rises to 6.7–7, after which the batch is pumped to the aging tank 20. The object of overacidifying the batch is to insure complete neutralization of all the sodium, but excessive acidification should be avoided as it reduces the thermal activity of the catalyst.

The aging in tank 20 is carried out under relatively gentle agitation by means of a gate-type agitator 21. The importance of this step has been discussed. After suitable aging the batch is coated, and this may be done either in the tank where the aging was carried out, or in the separate tank 22 that is illustrated in the drawing.

In the preparation of a catalyst consisting of 90% silica and 10% alumina, an aluminum sulphate solution containing the equivalent of 7% $Al_2O_3$ is preferably employed. This alum solution is preferably introduced through a perforated trough at the top of tank 22 to obtain uniform mixing without local overconcentration. After complete mixing a 16% ammonia solution is introduced into the tank, preferably through a submerged perforated pipe, in amounts sufficient to raise the pH to 4.5–4.8 as shown by the pH indicator 23. The batch is then passed to the feed tank 24, and from there it is pumped to the first stage filter 25.

The details of the filtration have been discussed above, and need not be repeated. However, it may be stated that the wash water on each of the filters is processed water containing substantially no hardness or alkali metal ions, acidified with sulfuric acid. The filters 25, 26 and 27 are Oliver-type rotary drum filters, the second and third having feed tanks 28 and 29 which receive repulped slurry from the preceding filtration stage. Each filter is provided with a wash water trough on the pick-up side of the wheel which collects surface wash water that would ordinarily run into the vat 30 and delivers it through lines 31, 32 and 33 to the feed tanks 24, 28 and 29 respectively. This prevents dilution of the slurry in the vats feeding the filter cloths, and assists greatly in maintaining the slurry at the proper solids content for filtration.

cake on a conveyor belt leading to the drying kiln. The four filters show the following typical performances:

| Filter No. | Cake Thickness | Solids in Slurry | Ave. $Na_2O$ Content | $Na_2O$ Removal | Cumulative $Na_2O$ Removal | pH of slurry |
|---|---|---|---|---|---|---|
| | | Per cent | Per cent | Per cent | Per cent | |
| 1 | 1–1.25 | 3.5–4.5 | 0.75 | 97.4 | 97.4 | |
| 2 | 0.75–1 | 5–5.5 | 0.18 | 75.7 | 99.3 | 4.5–5.6 |
| 3 | 0.75–1 | 5.5–6 | 0.06 | 69.0 | 99.8 | 4.3–4.5 |
| 4 | 0.5–0.75 | 6–6.5 | 0.018 | 68.0 | 99.9 | 4.0–4.5 |

The following is a specific example of operation in accordance with this embodiment of our invention:

253 gallons of 41° Bé. silicate of soda are diluted with 1580 gallons of purified water in the tank 1 and acidified with approximately 170 gallons of 25% sulfuric acid by the procedure described above. The volume of ammonia for raising the pH to 6.7–6.8 is negligible. The batch is then pumped by air displacement pumps to the aging tank 20 and tank 1 is rinsed with about 100 gallons of water which is added to the batch in tank 20. This results in a slurry containing 4.5% of $SiO_2$.

Figure 3:
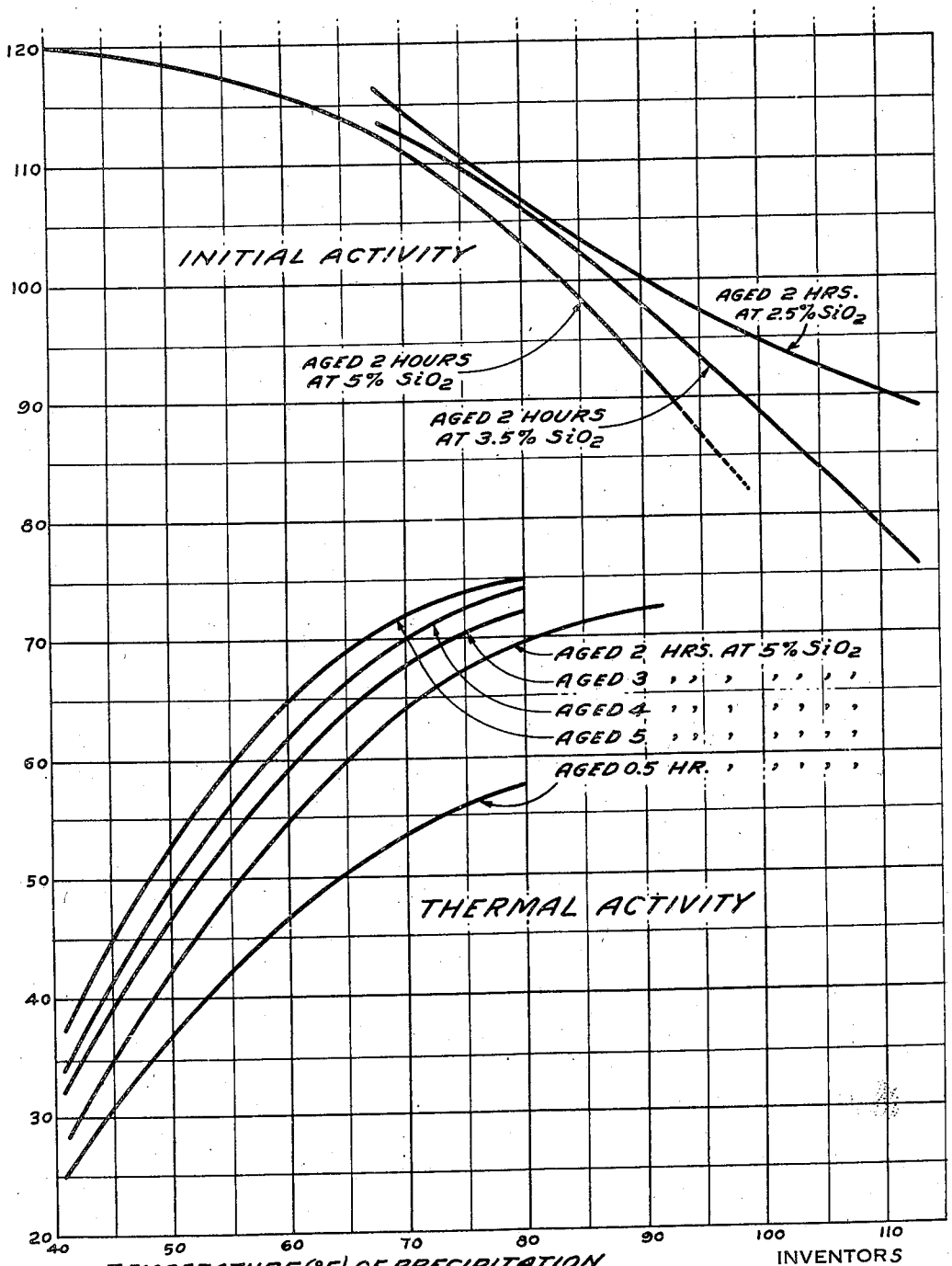
Fig. 3 is a graph showing the effect of temperature, solids content and time of aging of uncoated silica slurries on the initial and thermal activities of the catalyst.
Figure 4:
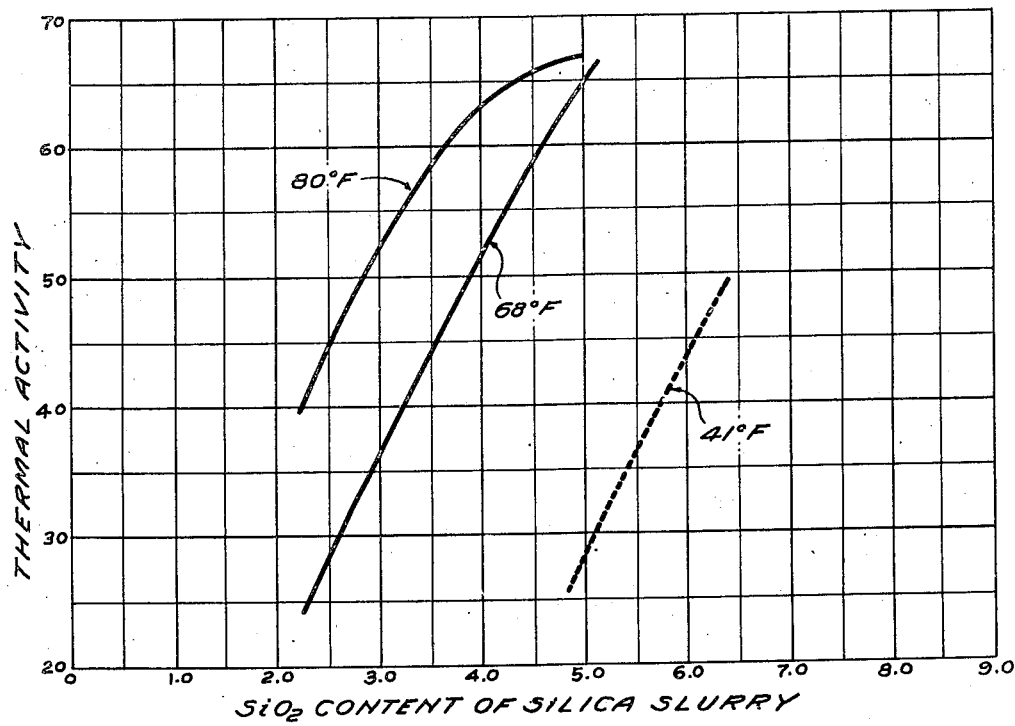
Fig. 4 is a graph showing in greater detail the effect on thermal activity of the silica content of the slurry.
Figure 5:
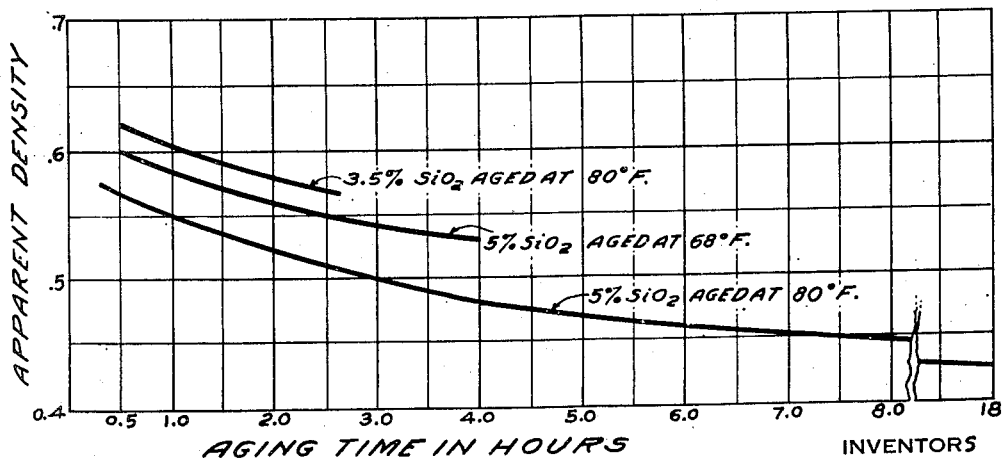
Fig. 5 is a graph showing the effect of aging time and temperature on the apparent density of the finished catalyst.

Although only one aging tank is illustrated in the drawing, it should be understood that a number of these are used in actual practice; the exact number to be used at any given time will depend on the rate of production and aging time desired. Overaging should be avoided for two reasons: first, it adversely affects the filtration of the slurry and second, it results in the progressive "fixation" of sodium in the filter cake, presumably by forming a zeolite. Agitation during the aging is important; it should be gentle so as not to break up the gel structure, but sufficient to facilitate the leaching of the sodium sulfate into the solution proper. The agitator 21 is therefore operated at about 16–20 R. P. M. An aging time of two hours is standard practice with a slurry temperature of about 80° F.; with slurries of lower temperature the aging time may be lengthened to as much as five hours, as is indicated on Fig. 3 of the drawings.

After aging, the batch is introduced into the coating tank 22, where 25% sulfuric acid is added in amounts such as to reduce the pH to about 3.5. Then 127 gallons of 7% $Al_2O_3$ equivalent aluminum sulfate solution is run in over a period of 10 minutes, and agitation is continued for an additional 10 minutes. This brings the pH down to 3–3.2. About 61 gallons of 16% aqua ammonia is next introduced, sufficient being used to raise the pH to 5.2–5.3. This precipitates the alumina, and the batch is now ready to be pumped to the filters.

Each of the three filters 25, 26 and 27 discharges into a repulper supplied with overflow water from the next succeeding filter vat, as indicated on the drawing. The fourth and final filter, which is not shown, discharges its filter As noted above, each of the first three filters is continuously wet with sufficient wash water to give a double displacement wash. The total consumption of wash water is about 500 gallons per minute in a plant producing 25–30 tons of catalyst per 24-hour day.

The filter cake from the fourth filter is dried to about 55–65% moisture in the first of two rotary kilns by countercurrent contact with hot products of combustion, which enter the kiln at 1200°–1500° F. and leave at 400–450° F. The product is then calcined in the second kiln to a final moisture content of 5% or less, using about the same kiln temperatures. Care should be taken to avoid heating the catalyst itself above 1200° F. The calcined product is then ground and screened to size. A catalyst prepared in this manner has an initial activity of 100–105 and a thermal stability of 60–75 when tested by the procedure outlined in the present specification.

Figure 2:
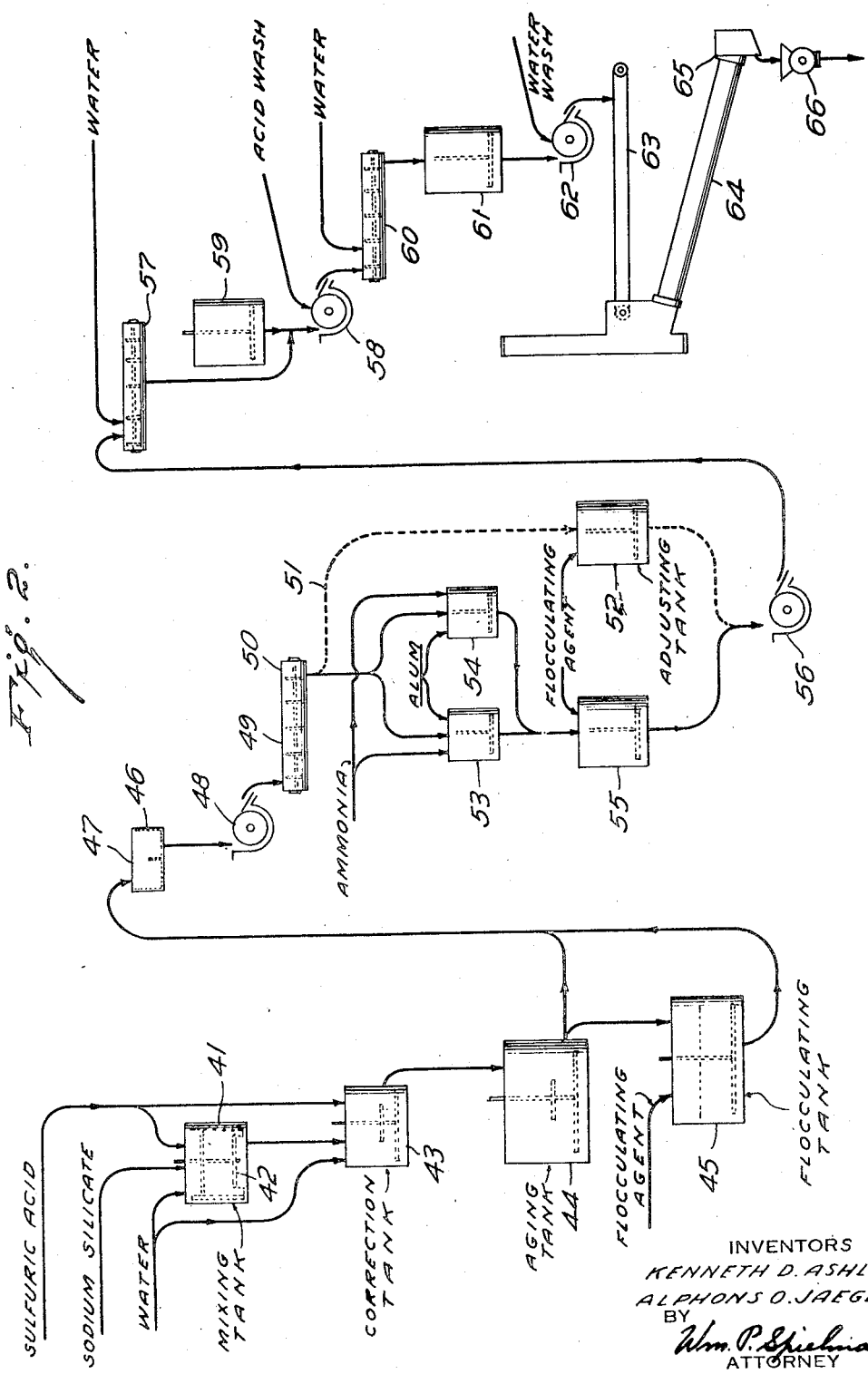
Fig. 2 is a flow sheet illustrating a process in which the coating step follows the first filtration. This figure is substantially the same as the drawing of our copending application Serial No. 459,262 referred to above.

In carrying out the process illustrated in Fig. 2 of the drawings we first prepare a dilute solution of sodium or potassium silicate in a mixing tank 41, which is provided with suitable agitators 42 to obtain uniform mixing of the charge. The diluted waterglass solution is neutralized with sulfuric, hydrochloric, nitric or other mineral acid to a pH of about 7.4–7.8, after which the agitation is continued for about ½ hour. The amounts and strength of the reagents are such that the solution contains about 5% $SiO_2$.

After the preliminary acidification the contents of tank 41 are discharged into tank 43, which is a correction tank equipped with a suitable agitator and of a size sufficient to permit a retention of the charge for about 75 minutes. At this point it may be stated that except where otherwise noted all the tanks subsequent to tank 41 are equipped with agitators which move very slowly, so that there is no tendency to break up or redisperse gels that have settled or been flocculated. In the tank 43 sufficient additional acid is added to bring the pH to about 7.02–7.8 and sufficient additional water to reduce the $SiO_2$ content to 3.8%.

After suitable retention in the correction tank 43 the gelatinous hydrated silica slurry resulting from the acid addition and dilution is passed to a blending and aging tank 44, wherein it may be aged under slow agitation for any suitable time. Aging of the slurry appears to increase the average particle size of the silica suspension either by agglomeration of the smaller particles or by their adhesion to larger sized particles. The aged slurry may then be delivered directly to the first filter 48 without additional flocculation, or it may be passed to the tank 45 for the addition of a flocculating agent to further improve its filtration and washing characteristics. In this tank the slurry is first brought to a pH of 4–6 by the addition of suitable amounts of sulfuric acid or other mineral acid after which an adhesive colloid is added. Representative adhesive colloids that we have used with success for this purpose are glue, gelatin, gluten and gluten-containing materials such as wheat flour and the like. These and similar flocculating agents are preferably employed in amounts of 0.001% to 0.1%, based on the weight of the slurry, and are distributed uniformly through the hydrated silica slurry by slow agitation.

The aged and flocculated suspension is pumped to a distributor box 46, which is a wooden box of relatively large cross-sectional area provided with one or more vertical partitions 47 and adapted to maintain the silica in a flocculated condition while supplying a steady flow of slurry to the filter 48. This may be an ordinary filter press or any other known type of filter, but is preferably a rotary filter of the vacuum drum type provided with fine water sprays for continuous washing of the filter cake, in order to aid in the separation of salts of alkali metals and other undesirable materials from the silica.

On the filter 48 the silica can be washed free from the major part of its water-soluble impurities by wash water which may be acidified with a little sulfuric or hydrochloric acid, the filtration and washing being greatly aided by the flocculation of the silica. In large scale operation the wash water from this and other similar washing steps of the process is preferably regenerated for reuse by contact with a cation-exchange resin such as sulfonated coal, which removes the sodium ions and regenerates free sulfuric acid or hydrochloric acid in the solution. The washed filter cake is then discharged into a repulper 49, which is an enamel-lined vessel fitted with a horizontal agitator 50 which may be a relatively high speed agitator. In the repulper the filter cake is again dispersed in water to form a uniform slurry for further treatment.

In the preparation of catalysts or catalyst carriers consisting essentially of silica the slurry from the repulper 49 may be passed through line 51 to a flocculating and adjusting tank 52 wherein the silica may be aged and flocculated by the addition of a flocculating agent if desired. In preparing mixed catalysts containing the active silica together with other catalytically active metal oxides and/or hydrogels the silica slurry is first passed to one of the two tanks 53 and 54. A solution of aluminum sulfate or other salt of the desired metal is then added to the slurry suspension after which sufficient ammonia is added as ammonium hydroxide to precipitate the hydrated metal oxide from its salts. Thus, for example, in the preparation of a silica-alumina catalyst of the type described in U. S. Patent No. 2,285,314 a solution of aluminum sulfate in water is added to the slurry of silica in the tank 53 under continuous agitation during one-half hour after which 8% of aqua ammonia is added during 10–20 minutes to bring the pH to 4.5–5.7. In the preparation of modified catalysts a small amount of zirconium or titanium sulfate may also be added and precipitated. By employing the tanks 53 and 54 in parallel it is possible to handle a second batch of the semi-purified silica while the alumina or other polyvalent metal is being added to and precipitated in the first batch, and any number of tanks may be employed in this manner in large scale operation.

After the addition and precipitation of alumina or other metal salts in the tanks 53 or 54 the resulting slurry is introduced into the aging and flocculation tank 55. Glue, gelatin or other suitable flocculating agent may be added in approximately the same quantities that were used in the tank 45 if desired, but this is not usually necessary since the hydrated aluminum oxide makes the slurry much easier to filter. In the tank 55 the slurry is preferably adjusted to 4.5–6% solids by the addition of water if necessary, and kept under slow agitation until the hydrated alumina-silica mixture is ready for filtration and washing. It is then passed to the filter 56, which is a rotary filter similar to the filter 48, and the flocculated solids are separated from the accompanying salt solution and washed with acidified water as before.

In order to reduce still further the content of alkali metal salts, ammonium salts, and other undesirable water-soluble material from the silica-alumina mixture, the filter cake is again preferably reslurried in water in a second repulper 57 and again filtered on a rotary filter 58, with or without reflocculation and aging in tank 59 depending on the condition of the solids at this point. The filter cake from the filter 58 may then be reslurried once more in the repulper 60 if desired, brought to a solids content of 5% and a pH of 4.3–5.0 in the tank 61 and filtered on the rotary filter 62 which is washed with water to remove the remaining water-soluble impurities. The filter cake is then removed at approximately 10% solids onto a belt conveyor 63, which discharges it into a calciner 64.

Because of the large quantities of water retained by gelatinous hydrated silica or silica-alumina mixtures a relatively large drier or calciner is necessary. In some cases, however, we have found that the purified gelatinous filter cake can be advantageously dried and calcined by a plurality of drying stages. Thus, for example, we may subject the wet filter cake to hot air or other drying gases by supporting it on a belt or other conveying mechanism which is passed continuously or intermittently through a drier of any suitable type, such as a hot air or steam heated drier. By this means we may remove as much as 40 to 60% of the water in the filter cake, after which the drying of the partially dried gel may be completed in a calciner of the rotary kiln type. Alternatively, the drying may be carried out in one or more rotary kilns, and such a calciner is illustrated on the drawings.

The calciner is preferably direct-fired in a fire box 65 and sufficient capacity is provided to heat the catalyst to temperatures of 600–700° F. before it is discharged. The dried material is then ground in a grinder 66 to 40-mesh size and is obtained as a product containing not more than 0.05% $Na_2O$ and little or no $Fe_2O_3$ or other undesirable materials.

In practicing this embodiment of our invention, 4.36 tons of sodium silicate in the form of commercial waterglass was added to the mixing tank 41 together with 18.4 tons of water, and after completing the dilution 2.2 tons of 24.9% sulfuric acid were added. After agitating for one-half hour the resulting slurry was passed through the correction and aging tanks 43 and 44, as previously described, and 0.015% of glue was added in the flocculating tank 45. After suitable flocculation the solids were then filtered off on the filter 48 and washed with 30.9 tons of water containing sufficient sulfuric acid to reduce the pH of the wash water to 2.8. The washed filter cake was repulped with 9.6 tons of water in the repulper 49 and run into tank 53, where a solution of 0.8 ton of aluminum sulfate in 1.6 tons of water was added. The alum was then precipitated by the addition of 1.87 tons of 8% NH₄OH solution and the resulting slurry was flocculated in the tank 55 by the addition of 0.015% of glue as before. After the following filtration step the cake on the filter 56 was washed with 25.5 tons of water containing sufficient sulfuric acid to reduce its pH to 2.5–3 and repulped in 12.9 tons of water. The same quantities of dilute acid and water were used on the filter 58 and repulper 60, but 21.9 tons of pure water were used to wash the filter cake on the filter 62. After the calcination 1.26 tons of an oil-cracking catalyst were obtained which contained 90% $SiO_2$ and 10% $Al_2O_3$ in a highly active condition.

The following is an example of the preparation of a pure silica catalyst by applying the principles of our invention:

12.5 lbs. of 41° Bé. sodium silicate containing 8.5% of $Na_2O$ and 28.5% of $SiO_2$ was diluted with 52.5 lbs. of pure water in a mixer of the turbine type (see Chemical Engineering Handbook, p. 1288). 6.5 lbs. of 25% sulfuric acid were added with vigorous agitation during 20–30 minutes, after which the mixer was emptied and washed with 24 lbs. of water containing 0.3–0.4 lb. of 25% sulfuric acid. The wash water was added to the precipitated silica slurry and the mixture was aged for 1.5–2 hours at a pH of 7.0–7.3. A water solution of glue was then added in amounts of 0.01–0.02% of glue and the flocculated hydrous silica was dewatered by filtration. A dried sample of the filter cake contained 0.22% sodium.

The filter cake was washed on the filter with an amount of wash water equal to the original weight of the slurry, sludged up with a little water and aged for 12 hours. It was then diluted with water to 4–6% solids, 5% being the preferred figure, 0.015% of glue was again added, and the silica slurry was again filtered and the filter cake washed with acidified water. The sodium content of a dried sample of the filter cake was 0.02%. The aging, flocculation, filtration and washing was repeated a third time, but in this case no acid was used in the wash water. This reduced the sodium content to 0.01%. The filter cake was then dehydrated and calcined as previously described and the resulting pure silica catalyst was ground to 4–6 mesh. It was well suited for use as a dehydration catalyst for the production of butadiene from butylene glycols.

In the foregoing specification we have described in detail the principles and most important features of our invention, which are illustrated by specific examples showing the best method known to us of applying these principles in commercial practice. It should be understood, however, that variations and modifications embodying these principles may be resorted to within the scope of the appended claims. The following are illustrative of the flexibility in operation that can be obtained by applying the principles of our invention:

The controlled aging of the silica slurry enables us to obtain many important advantages in catalyst manufacture. Since the best catalysts should possess both high initial activity and good thermal stability, we are able to obtain a simultaneous improvement in both characteristics by varying the conditions of silica precipitation and aging from batch to batch. Thus, for example, one batch of gelatinous silica may be aged at, say, 5% solids for two hours while another batch is aged at 3.5–4% solids for the same length of time. The two batches may then be mixed, coated with 10% of alumina in the usual manner, filtered and washed to remove alkali metal salts and calcined to form the finished catalyst.

Similar variations may be made in the temperature of aging. One batch may be aged at 65–75° F. while a second batch is being aged at 80–90° F. The two batches may then be mixed together. Similar variations may be made in the pH of two or more batches, one being aged at a pH of 5.8, for example, the second at a pH of 6.5 and a third to a pH of 7.0, after which the three batches may be mixed. Other variations of this nature will be apparent from the foregoing description.

One important method of applying the principles outlined above is of particular commercial importance in avoiding the seeding effect of overaged material. In the daily operation of a catalyst manufacturing plant by the procedure outlined on Fig. 1 of the drawings it sometimes happens that one or more of the batches may become dehydrated to too great an extent by overaging. In order to avoid the effects of this condition, an occasional batch may be mixed with preceding or subsequent batches in an unaged condition or after an only partial aging. Greater uniformity in the quality of the plant product is obtained by this procedure.

What we claim is:

1. A process for the manufacture of adsorbent silica gels of high porosity and adsorptive capacity but resistant to loss of activity on heating which comprises precipitating hydrated silica in granular condition from an aqueous alkali metal silicate solution by agitating and acidifying the solution, flocculating the hydrated silica in the resulting slurry by aging with agitation at a pH of 5.5–8.1 for 0.5 to 5 hours at a temperature within the range of 40°–100° F., and at a solids content of 3.5–6%, repeatedly filtering while maintaining the aged slurry at a pH of about 4–5.5 and washing the filtered solids to remove dissolved salts, and drying and calcining the filtered solids by passing them through a rotating kiln in countercurrent contact with hot gases entering at a temperature of 1200–1500° F.

2. A process for the manufacture of an activated silica gel catalyst of high porosity and adsorptive capacity but resistant to loss of activity on heating which comprises precipitating hydrated silica in granular condition from an aqueous alkali metal silicate solution having a concentration such as to produce a precipitated slurry of 3.5–6% solids content by acidifying the solution with strong agitation, flocculating the resulting slurry of granular hydrated silica by aging it with gentle agitation at a solids content of 3.5–6%, a pH of 5.5–8.1 and a temperature within the range of 40°–100° F. for 0.5 to 5 hours, precipitating aluminum oxide on the silica, repeatedly filtering and washing the resulting slurry at a pH of about 4–5.5 to remove water-soluble salts, and drying and calcining the filtered solids to form the catalyst.

3. A method according to claim 2 in which the hydrated silica is precipitated by acidifying the alkali metal silicate solution while forcing the slurry through a screen having openings of 6–8 per linear inch.

4. A method according to claim 2 in which the slurry is filtered and washed on a continuous rotary filter at a pH of 4–5.5.

5. A method according to claim 2 in which the filtered solids are calcined by countercurrent contact with hot gases having an entering temperature of 1200–1500° F.

6. A process for the manufacture of an activated silica gel catalyst of high porosity and adsorptive capacity but resistant to loss of activity on heating which comprises precipitating granular silica from an aqueous alkali metal silicate solution by acidifying the solution with agitation to a pH of 4–6, then flocculating the slurry by aging at a pH of 5.5–8.1 and at a temperature within the range of 40°–100° F. for 0.5–5 hours with gentle agitation at a solids content of 3.5–6%, then precipitating aluminum oxide on the silica and repeatedly filtering the resulting slurry and washing to remove water-soluble salts at a pH of 4 to 5.5, and finally calcinating the filtered catalyst-forming material by passing it in countercurrent contact with a stream of hot gases.

7. In a process for the manufacture of an adsorbent silica gel having a low content of water-soluble salts, the method of obtaining a filterable precipitate of grains of hydrated silica of relatively uniform particle size which comprises forming a two-phase slurry consisting of small grains of hydrated silica suspended in a continuous aqueous phase by adding to an aqueous alkali metal silicate solution a sufficient quantity of an acid to acidify the mixture, the concentration of the acid and of the alkali metal silicate solution being such that the resulting slurry contains about 3% to 6% of $SiO_2$ after acidification, and continuously recirculating the slurry during its formation through a screen of approximately 6 to 8 meshes per inch to produce lines of shear therein.

8. A method according to claim 7 in which the resulting slurry is flocculated by aging with gentle agitation at 50–100° F. for 0.5–5 hours at a pH of 5.5–8.1.

9. A process for the manufacture of an activated silica gel catalyst of high porosity and adsorptive capacity but resistant to loss of activity on heating which comprises precipitating granular hydrated silica from an aqueous alkali metal silicate solution having a concentration such as to produce a slurry of 3.5–6% solids content by acidifying the solution to a pH of 4–6 with strong agitation, then flocculating the slurry by aging it for 0.5 to 5 hours at a pH of 5.5–8.1 and a solids content of 3.5–6% at temperatures of 50–100° F. with gentle agitation, then precipitating aluminum oxide on the silica, repeatedly filtering the resulting slurry and washing to remove water-soluble salts and finally drying and calcining the filtered catalyst-forming material to form a hard, porous gel.

10. In a process for the manufacture of an adsorbent silica gel having a low content of water-soluble salts, the steps which comprise aging an aqueous hydrated granular silica slurry having a solids content of 3.5–6% and a pH of 5.5–8.1 at temperatures of 50–100° F. for 1–5 hours and filtering the silica after aging on a continuous rotary filter at a pH of 4–5.5 while continuously wetting the entire filter cake with wash water.

11. A process for the manufacture of a silica-alumina gel catalyst of high porosity and adsorptive capacity for the catalytic cracking of petroleum hydrocarbons by the "fluid stream" process which comprises precipitating hydrated silica in granular condition from an aqueous alkali metal silicate solution by acidifying the solution with strong agitation, flocculating the resulting hydrated silica slurry by aging at a solids content of 3.5–6% and a pH of 5.5–8.1 and at a temperature within the range of 40°–100° F. for 0.5–5 hours, precipitating aluminum oxide in the silica slurry, repeatedly filtering the resulting silica-alumina slurry and washing to remove water-soluble salts, calcining the filtered catalyst-forming material by passing it through a rotating kiln in countercurrent contact with hot gases passing through the kiln at a velocity such that substantial quantities of catalyst are blown from the kiln by the gases, separating entrained catalyst from the exit gases from the kiln and mixing the catalyst so separated with the main body of catalyst product.

12. A method of producing an activated silica gel catalyst having an alkali metal content less than 0.05% $Me_2O$ which comprises preparing a catalyst-forming composition composed of grains of hydrated silica containing a smaller quantity of alumina, about 90% of water, and a content of water-soluble alkali metal salts greater than that corresponding to 0.05% $Me_2O$ but not greater than 0.1% on a dry basis and drying and dehydrating said composition by passing it in countercurrent contact with hot gases having a temperature of 1200–1500° F., whereby a major proportion of the water-soluble alkali metal salts is removed from the composition along with the water and the alkali metal salt content of the dry catalyst is reduced below that corresponding to 0.05% $Me_2O$.

13. A method of preparing a silica-containing catalyst which comprises the steps of forming an aqueous slurry of gelatinous silica containing water-soluble inorganic salts, adjusting the pH of the slurry to 5.5–8.1, aging the slurry for 0.5–5 hours at 40°–100° F. at a solids content of 3.5–6%, adjusting the pH of the slurry to about 3–3.5, adding an aqueous aluminum sulfate solution to the slurry and precipitating alumina therein by raising the pH to 5.0–5.5, and separating the alkali metal salts by dewatering and washing the slurry.

KENNETH D. ASHLEY.
ALPHONS O. JAEGER.

REFERENCES CITED

The following references are of record in the file of this patent:

UNITED STATES PATENTS

| Number | Name | Date |
|---|---|---|
| 1,577,186 | Patrick | Apr. 6, 1926 |
| 1,579,262 | Vickery et al. | Apr. 6, 1926 |
| 1,665,264 | Holmes | Apr. 10, 1928 |
| 1,832,153 | Stoewener | Nov. 17, 1931 |
| 1,900,859 | Connolly et al. | Mar. 7, 1933 |
| 1,958,710 | Moyer | May 15, 1934 |
| 2,270,090 | Thomas | Jan. 13, 1942 |
| 2,280,650 | Kassel | Apr. 21, 1942 |
| 2,323,583 | Wilson | July 6, 1943 |
| 2,326,523 | Connolly et al. | Aug. 10, 1943 |
| 2,326,706 | Thomas et al. | Aug. 10, 1943 |
| 2,331,473 | Hyman | Oct. 12, 1943 |
| 2,412,958 | Bates et al. | Dec. 24, 1946 |

OTHER REFERENCES

Weiser et al., Industrial and Engineering Chemistry, Nov. 1940, pages 1487–1490.